United States Patent
Hamada et al.

(10) Patent No.: US 7,356,308 B2
(45) Date of Patent: *Apr. 8, 2008

(54) RADIO COMMUNICATION APPARATUS AND RADIO COMMUNICATION METHOD, RADIO COMMUNICATION SYSTEM, RECORDING MEDIUM, AND COMPUTER PROGRAM

(75) Inventors: Osamu Hamada, Kanagawa (JP); Hiroshi Kakuda, Tokyo (JP); Koji Nishimura, Tokyo (JP); Takashi Sasai, Kanagawa (JP); Kazuya Odagiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/648,613

(22) Filed: Jan. 3, 2007

(65) Prior Publication Data

US 2007/0111739 A1 May 17, 2007

Related U.S. Application Data

(63) Continuation of application No. 10/485,978, filed as application No. PCT/JP03/06505 on May 26, 2003, now Pat. No. 7,177,595.

(30) Foreign Application Priority Data

Jun. 7, 2002 (JP) ............................ P2002-166849

(51) Int. Cl.
*H04B 5/00* (2006.01)

(52) U.S. Cl. .................... 455/42.1; 455/550.1; 455/39; 455/556.1; 455/565; 370/338; 340/539.1

(58) Field of Classification Search ................. 455/39, 455/403, 421, 422, 41.1–41.3, 556.1, 426, 455/550.1, 352–353, 458, 565, 517, 564; 340/539.1, 539.11; 370/328, 338

See application file for complete search history.

(56) References Cited

U.S. PATENT DOCUMENTS 6,323,775 B1 11/2001 Hansson (Continued)

FOREIGN PATENT DOCUMENTS

JP 2001-145163 5/2001

(Continued)

*Primary Examiner*—George Eng
*Assistant Examiner*—Kamran Afshar
(74) *Attorney, Agent, or Firm*—Finnegan, Henderson, Farabow, Garrett & Dunner, L.L.P.

(57) ABSTRACT

The present invention relates to a radio communication apparatus and a radio communications method, a radio communication system, a recording medium, and a computer program in which a response signal to an inquiry is returned to a master only when instructions to perform radio communications are issued. A CPU 51 blinks LED 56 when an inquiry signal is received, and transmits a response to the inquiry signal when a user who has referred to lighting of the LED 56 operates a connection response button 53. The connection response button 53 is operated when the user issues radio communications instructions with respect to the inquiry signal. In other words, even when wireless headphones 2 are within an area capable of radio communications with the master, only if the connection response button 53 is operated by the user, it sends to the master a response to the inquiry, and establishes connection. The present invention may be applied to a wireless storage server, wireless headphones, and audio reproduction apparatuses.

2 Claims, 13 Drawing Sheets

U.S. PATENT DOCUMENTS

| | | |
|---|---|---|
| 6,600,902 B1 | 7/2003 | Bell |
| 6,792,247 B2 | 9/2004 | Law et al. |
| 6,826,387 B1 | 11/2004 | Kammer |
| 6,856,789 B2 | 2/2005 | Pattabiraman et al. |
| 6,865,371 B2 | 3/2005 | Salonidis et al. |
| 6,897,778 B1 | 5/2005 | Borlenghi |
| 6,928,263 B2 | 8/2005 | Blake et al. |
| 7,076,210 B2 * | 7/2006 | Sasai et al. ............... 455/41.2 |
| 7,177,595 B2 * | 2/2007 | Hamada et al. ............ 455/41.2 |
| 2002/0009992 A1 | 1/2002 | Jensen |
| 2002/0037699 A1 | 3/2002 | Kobayashi et al. |
| 2002/0045454 A1 * | 4/2002 | Iwata ........................ 455/41 |
| 2002/0111138 A1 | 8/2002 | Park |
| 2002/0120750 A1 * | 8/2002 | Nidd ........................ 709/227 |
| 2002/0176579 A1 * | 11/2002 | Deshpande et al. ......... 380/270 |
| 2002/0197959 A1 * | 12/2002 | Annola et al. ............... 455/41 |
| 2003/0008612 A1 | 1/2003 | Andreason |
| 2003/0162556 A1 | 8/2003 | Libes |
| 2004/0009748 A1 | 1/2004 | Heinonen et al. |
| 2004/0048621 A1 | 3/2004 | Takahashi et al. |
| 2005/0202782 A1 | 9/2005 | Sasai et al. |

FOREIGN PATENT DOCUMENTS

| | | |
|---|---|---|
| JP | 2002-101104 | 4/2002 |

\* cited by examiner

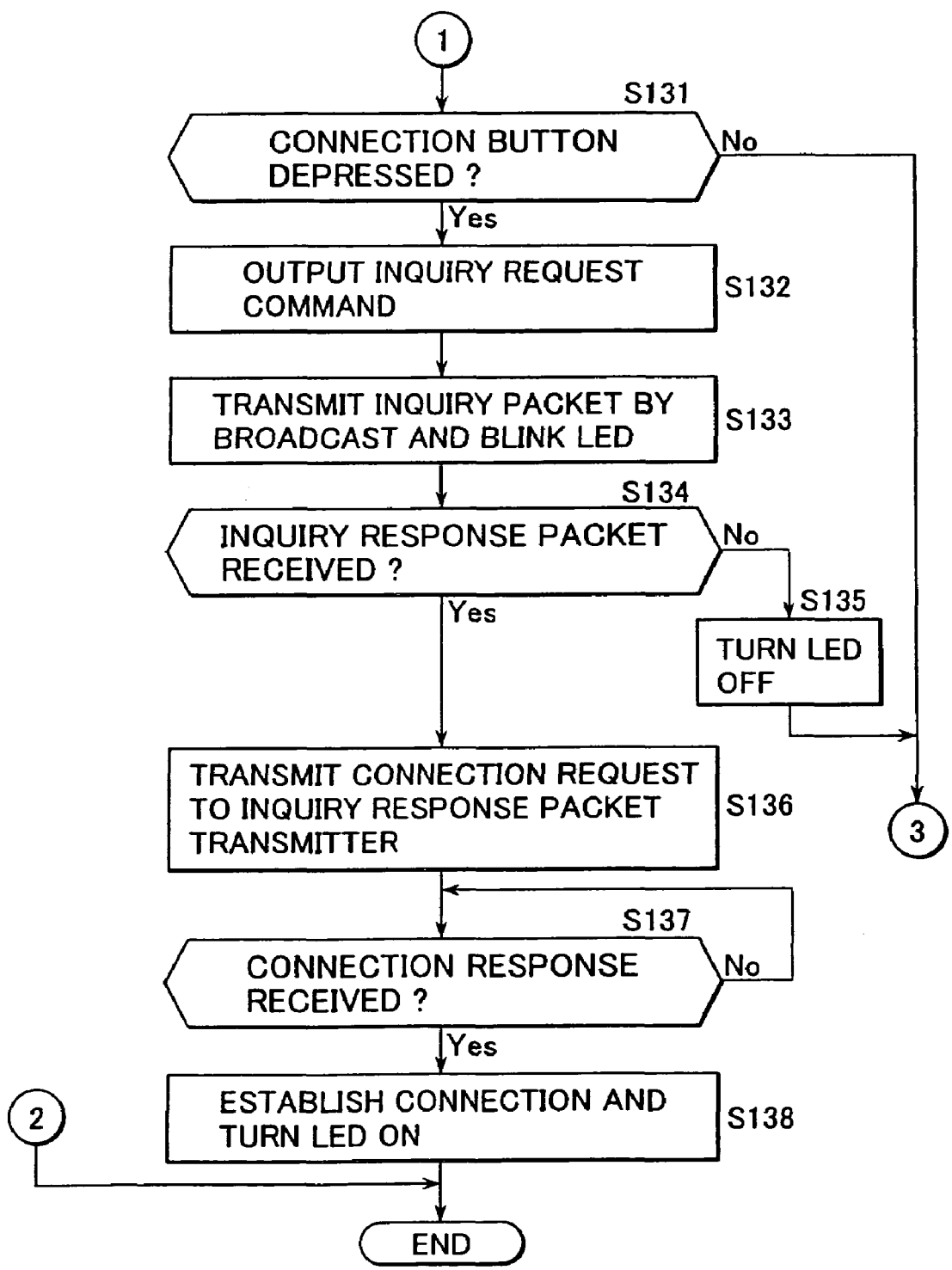

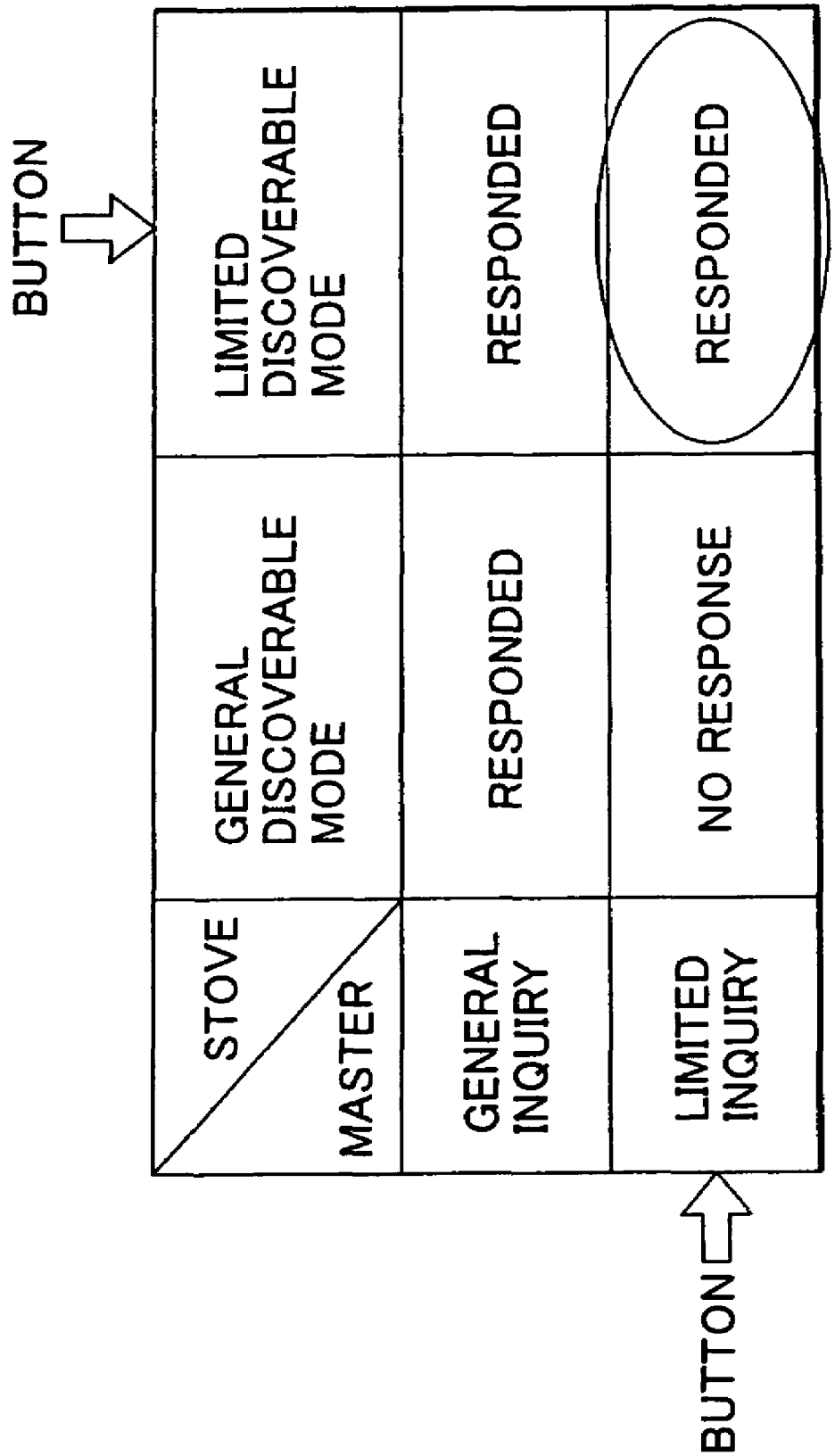

RADIO COMMUNICATION APPARATUS AND RADIO COMMUNICATION METHOD, RADIO COMMUNICATION SYSTEM, RECORDING MEDIUM, AND COMPUTER PROGRAM

This is a continuation of application Ser. No. 10/485,978, filed Sep. 20, 2004, now U.S. Pat. No. 7,177,595 the contents of which are incorporated herein by reference. Application Ser. No. 10/485,978 is the U.S. national stage of International Application No. PCT/JP03/06505, filed on May 26, 2003, and claims priority to Japanese Patent Application No. P2002-166849, filed Jun. 7, 2002.

TECHNICAL FIELD

The present invention relates to a radio communication apparatus and a radio communication method, a radio communication system, a recording medium, and a computer program, in particular to a radio communication apparatus and a radio communications method, a radio communication system, a recording medium, and a computer program, which are capable of easily establishing radio connection in radio communications.

BACKGROUND ART

In recent years, short-distance radio communication technologies, such as IrDA (InfraRed Data Association) and Bluetooth (registered trademark) communication, have spread widely.

IrDA is a radio communication technology using infrared rays, permitting communication at 1.152 Mbps and 4 Mbps by only set up of software.

On the other hand, the Bluetooth communication is a radio transmission system which uses a 2.4 GHz zone, and does not have directivity but high permeability, unlike a case where infrared is used. The Bluetooth communication is expected to be an interface which realizes a data exchange regardless of devices, such as a personal computer, a peripheral apparatus, a household appliance, and a portable phone.

As for Bluetooth compliant devices, there are a "master" which determines a frequency hopping pattern and a "slave" which communicates with and follows the master, and a network comprises one master and a plurality of (seven sets, at most) slaves. The slaves perform communication between the master and the slaves, synchronizing with the frequency hopping pattern determined by the master. Communications between the devices are always performed through the master, so that no direct communication is performed between the slaves.

When choosing a communication counterpart's device in the Bluetooth communications, it is common that the master transmits an inquiry signal (Inquiry), by broadcasting, to devices which exist around itself so as to search for a possible device to be communicated, collect responses from the slaves, display, on a display screen, a list of model names, device ID's, etc. of devices which may be communicated, and have a user to choose a communication counterpart's device out of them.

However, with this method, there are many devices which allow radio communication within an area where communications are available and, even if most of the devices do not desire communication, all devices will be listed and displayed on a display section of the master. For example, when the list is displayed on the display screen by means of device ID's, it is difficult for the user to choose a desired one out of the displayed list including the plurality of apparatus ID's which cannot be grasped intuitively. Similarly, when the list on the display screen is displayed by means of model names and a plurality of more apparatuses of the same type are included in the apparatuses which can communicate, it is difficult to determine which device the user to choose.

In particular as for a short-distance radio communication technology which does not have directivity, such as the Bluetooth communication, unlike the communications having the directivity such as the infrared technology etc., it is difficult to intuitively choose a communication counterpart's device from the plurality of devices which can communicate, since devices within a predetermined area can communicate in all directions.

In addition, in order to determine a communication counterpart's device, a conventional method forces the user to perform operations such as referring to the display and choosing a desired device out of them, and there is a need for a technology in which the communication counterpart's device can be intuitively determined by an easy operation.

DISCLOSURE OF THE INVENTION

The present invention has been conceived in view of such situation and allows intuitively determining a radio communication device to be a communication counterpart with a considerably simple operation.

The radio communication apparatus of the present invention is characterized by comprising a receiving means for receiving the inquiry signal asking whether or not radio communications are possible, a first input means for receiving an operation input when the user permits communication of information to another radio communication apparatus, and a transmitting means for transmitting predetermined information to another radio communication apparatus when an operation is inputted by the first input means.

A notice means may be further provided for notifying that an inquiry signal has been received by the receiving means.

Further, the notice means may be made to notify that a data link with another communication apparatus has been established.

Still further, the notice means may be made to notify that the data link with another communication apparatus has not been established.

The notice means may be constituted by a LED.

The first input means may be constituted by a button and the LED may be constructed by integrating with the button.

The notice means may be made to notify, by blinking the LED, that the inquiry signal has been received, further notify, by lighting the LED, that the data link with another communication apparatus has been established, and further notify, by turning the LED off, that the data link with another communication apparatus has not been established.

The notice means may be made to carry out audio reproduction of a message notifying that the inquiry signal has been received.

The first input means may be operated by the user notified by the notice means that the inquiry signal has been received, and the predetermined information which is transmitted by the transmitting means to another radio communication apparatus may be an inquiry response signal to the inquiry signal.

The first input means may be operated by the user notified by the notice means that the inquiry signal has been received, and the predetermined information which is transmitted by the transmitting means to another radio communication apparatus may be a connection request signal.

When the inquiry signal is received by the receiving means after the first input means received the operation input by the user, the transmitting means may be caused to transmit the predetermined information to another radio communication apparatus.

When the inquiry signal is received by the receiving means during the period when the first input means receives the operation input by the user, the transmitting means may be caused to transmit the predetermined information to another radio communication apparatus.

Only during the period when the first input means receives the operation input by the user, the receiving means may be caused to receive the inquiry signal.

Further, a generation means for generating an inquiry signal for searching for another radio communication apparatus capable of performing radio communications, a second input means for issuing instructions to transmit the inquiry signal, and a transmitting means for transmitting an inquiry signal when the instructions to transmit the inquiry signal are issued by the second input means may be provided.

The notice means may be made to notify further that the inquiry signal has been transmitted by the transmitting means.

The notice means may be made to notify further that the data link with another communication apparatus has been established.

The notice means may be made to notify further that the data link with another communication apparatus has not been established.

The first input means and the second input means may be unified and constructed as a third input means. When the inquiry signal is received before the third input means receives the operation input by the user, the third input means may be made to operate as the first input means, and when the third input means receives an operation input by a user before the receiving means receives the inquiry signal, the third input means may be operated as the second input means.

The third input means may be constituted by the button, the notice means may be constituted by the LED which may be integrated with the button.

The radio communications method according to the present invention is characterized by comprising: a reception control step of controlling reception of an inquiry signal for asking whether or not radio communications are available, the inquiry signal being transmitted from another radio communication apparatus; an input control step of controlling an operation input when a user permits communication of information to another radio communication apparatus; and a transmitting control step of controlling transmission of predetermined information to another radio communication apparatus when an input of operation is controlled by the input control step.

The computer program recorded on a recording medium according to the present invention is characterized by comprising: a reception control step of controlling reception of an inquiry signal for asking whether or not radio communications are available, the inquiry signal being transmitted from another radio communication apparatus; an input control step of controlling an operation input when a user permits communication of information to another radio communication apparatus; and a transmitting control step of controlling transmission of predetermined information to another radio communication apparatuses when an input of operation is controlled by an input control step.

The computer program according to the present invention is characterized by comprising: a reception control step of controlling reception of an inquiry signal for asking whether or not radio communications are available, the inquiry signal being transmitted from another radio communication apparatus; an input control step which controls an operation input when a user permits communication of information to another radio communication apparatus; and a transmitting control step of controlling transmission of predetermined information to another radio communication apparatus when an input of operation is controlled by the input control step.

The radio communication systems according to the present invention is characterized by comprising: a generation means for generating an inquiry signal for searching for a second radio communication apparatus with which a first radio communication apparatus may carry out radio communications; a first input means for receiving an operation input when a user issues instructions to transmit an inquiry signal generated by the generation means to every apparatus which allows radio communications within a predetermined area; and a first transmitting means for transmitting the inquiry signal to every apparatus which allows radio communications within the predetermined area when the instructions to transmit the inquiry signal are issued by the first input means, and further comprising: a second input means for receiving an operation input when the user permits the second radio communication apparatus to communicate information to the first radio communication apparatus; a receiving means for receiving the inquiry signal transmitted by the first transmitting means from the first radio communication apparatus; and a second transmitting means for transmitting predetermined information to the first radio communication apparatus when the second input means inputs a fact that the user permits communicating of information to the first radio communication apparatus and the inquiry signal is received by the receiving means.

The predetermined information transmitted by the second transmitting means may be an inquiry response signal to the inquiry signal.

The predetermined information transmitted by the second transmitting means may be a connection request signal to the first radio communication apparatus.

In the radio communication apparatus and the radio communications method and the computer program according to the present invention, the inquiry signal for asking whether or not the radio communications transmitted from another radio communication apparatus is received, the operation is inputted when the user permits communicating of information to another radio communication apparatus. When the operation is inputted, predetermined information is transmitted to another radio communication apparatus.

As for the radio communication system according to the present invention, the inquiry signal for searching for the second radio communication apparatus which can perform radio communications is generated in the first radio communication apparatus. When the user issues instructions to transmit the inquiry signal to every apparatus which allows radio communications within the predetermined area, and when the operation is inputted and the instructions to transmit the inquiry signal, which is then transmitted to every apparatus which allows radio communications within the predetermined area. When the user permits the second radio communication apparatus to communicate information to the first radio communication apparatus, the operation is inputted, the inquiry signal transmitted from the first radio communication apparatus is received and communication of information to the first radio communication apparatus is permitted, and when the inquiry signal is received, predetermined information is transmitted to the first radio communication apparatus.

BRIEF DESCRIPTION OF THE DRAWINGS

FIG. 14 is a flow chart for explaining a process of the audio reproduction apparatus; and FIG. 15 is a table for explaining modes of transmission and reception for an inquiry in the Bluetooth communication.

BEST MODES FOR IMPLEMENTING THE INVENTION

With reference to the drawings, embodiments according to the present invention will be described as follows:

A radio communication system to which the present invention is applied will be described by using FIG. 1.

A wireless storage server 1 stores therein audio data and transmits the audio data to one that is desired by a user among wireless headphones 2-1 through 2-n which exist within a predetermined area where communications are available by radio communications by means of communication systems, such as the Bluetooth communication, for example. The wireless storage server 1 becomes a master of radio communications.

The wireless storage server 1 has a connection button 11. When the connection button 11 is depressed, the wireless storage server 1 transmits an inquiry signal (Inquiry) by broadcasting (that is, to all devices within a wireless network), searches for devices which can communicate, collects responses from wireless headphones 2 which are slaves, detects the wireless headphone 2 which can communicate, and establishes communication (a data link is established), where the inquiry signal includes a search signal for searching for a radio communication apparatus which can communicate and a notice signal for notifying that the radio communication apparatus (itself) exists.

The wireless headphones 2-1 through 2-n may communicate with the wireless storage server 1 by radios, receive and reproduce audio data transmitted by the wireless storage server 1. The wireless headphones 2 serve as a slave in radio communications.

Below, when the wireless headphones 2-1 through 2-n do not need to be distinguished separately, they are referred to only as wireless headphones 2 generically.

Figure 2:
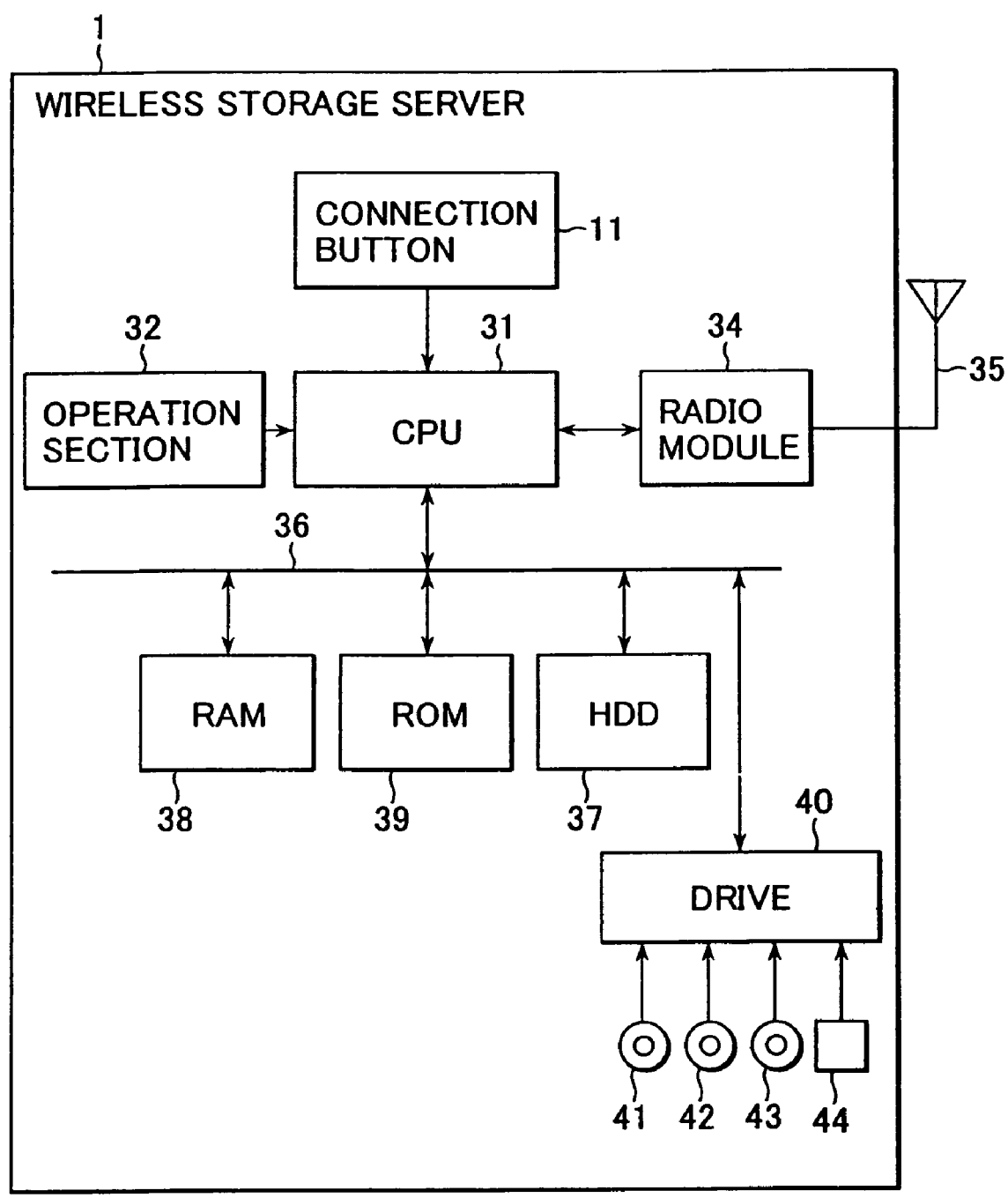
FIG. 2 is a block diagram showing a structure of a wireless storage server to which the present invention is applied.

FIG. 2 is a block diagram showing a structure of the wireless storage server 1.

A CPU 31 controls operation of the wireless storage server 1. For example, when the connection button 11 is operated, the CPU 31 controls a radio module 34, transmits an inquiry signal via an antenna 35 by broadcasting, reads information stored in an HDD 37 according to an operation inputted into an operation section 32, and controls the radio module 34 so as to transmits the information to a device to be communicated via an antenna 35.

The operation section 32 comprises a button, a keyboard, a jog dial, a touch panel, etc., receives the user's operation input and supplies contents of the operation to the CPU 31.

Figure 1:
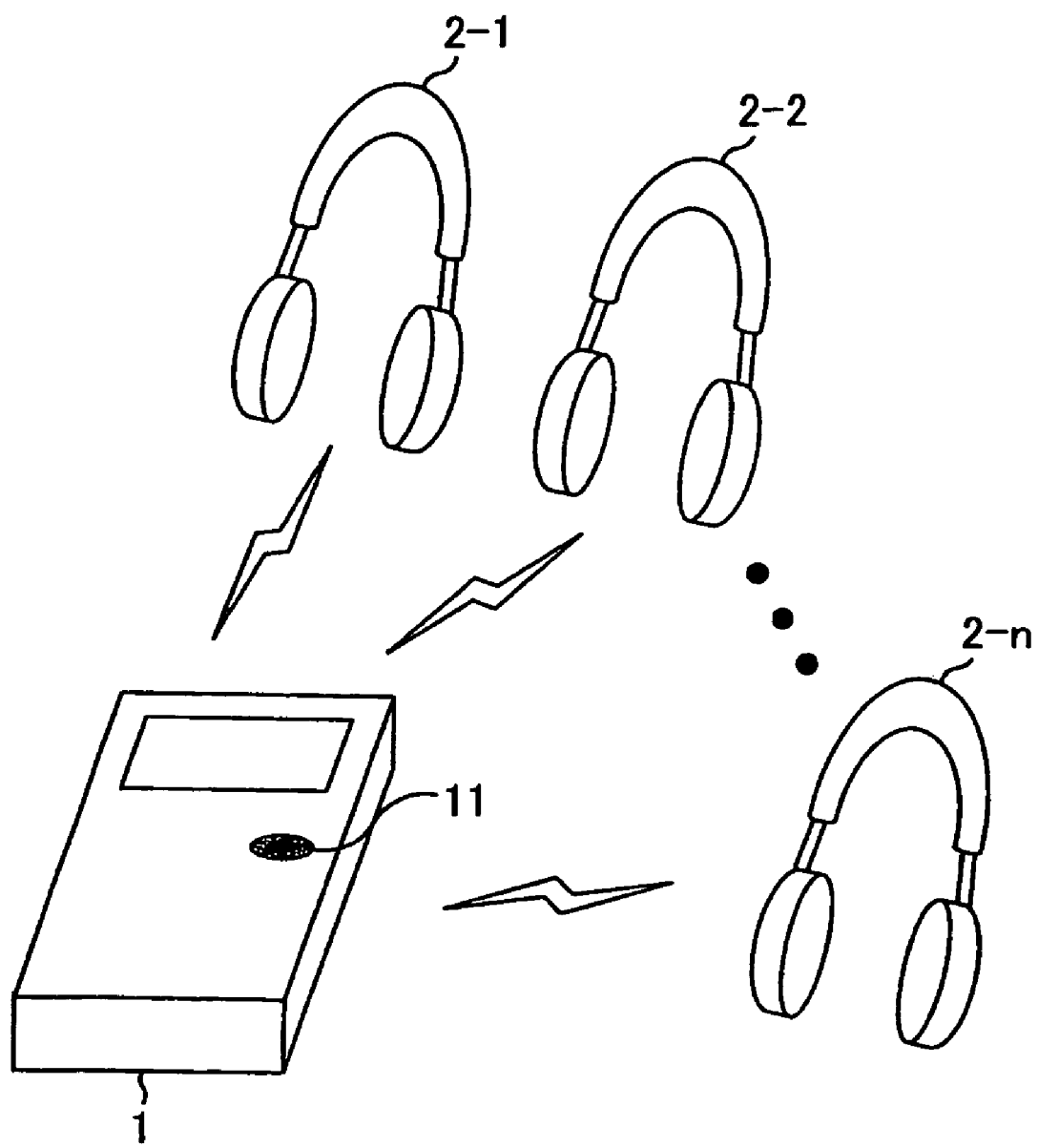
FIG. 1 is a view for explaining a radio communication system to which the present invention is applied.

The connection button 11 is operated when the user issues instructions to start communication with the wireless headphones 2, as described by using FIG. 1.

The radio module 34 converts the data, a control signal, etc., which are supplied by the CPU 31 into a predetermined format by which radio communications are available, amplifies them, and transmits them via the antenna 35, or it receives and amplifies inputs such as data, a response signal, etc., which are received by the antenna 35, converts them into the format which can be processed by the CPU 31, and supplies them to the CPU 31.

The HDD (Hard Disk Drive) 37, a RAM (Random Access Memory) 38, and a ROM (Read Only Memory) 39 are connected to the CPU 31 via a bus 36.

The HDD 37 drives hard disks to be caused to record therein or reproduce the computer program and information which are executed by a CPU 11, records music contents to be transmitted to the wireless headphones 2 so as to be reproduced, and outputs them via the bus 36 according to control of the CPU 31.

The RAM 38 stores the computer program used in the execution by the CPU 31 and a parameter which changes suitably in the execution. The ROM 39 stores basically fixed data out of the parameters for operation and the computer program which are used by the CPU 31.

A drive 40 is connected to the CPU 31 via the bus 36, as needed. The drive 40 is provided with a magnetic disk 41, an optical disc 42, a magneto-optical disc 43, and semiconductor memory 44 so as to communicate data.

Figure 3:
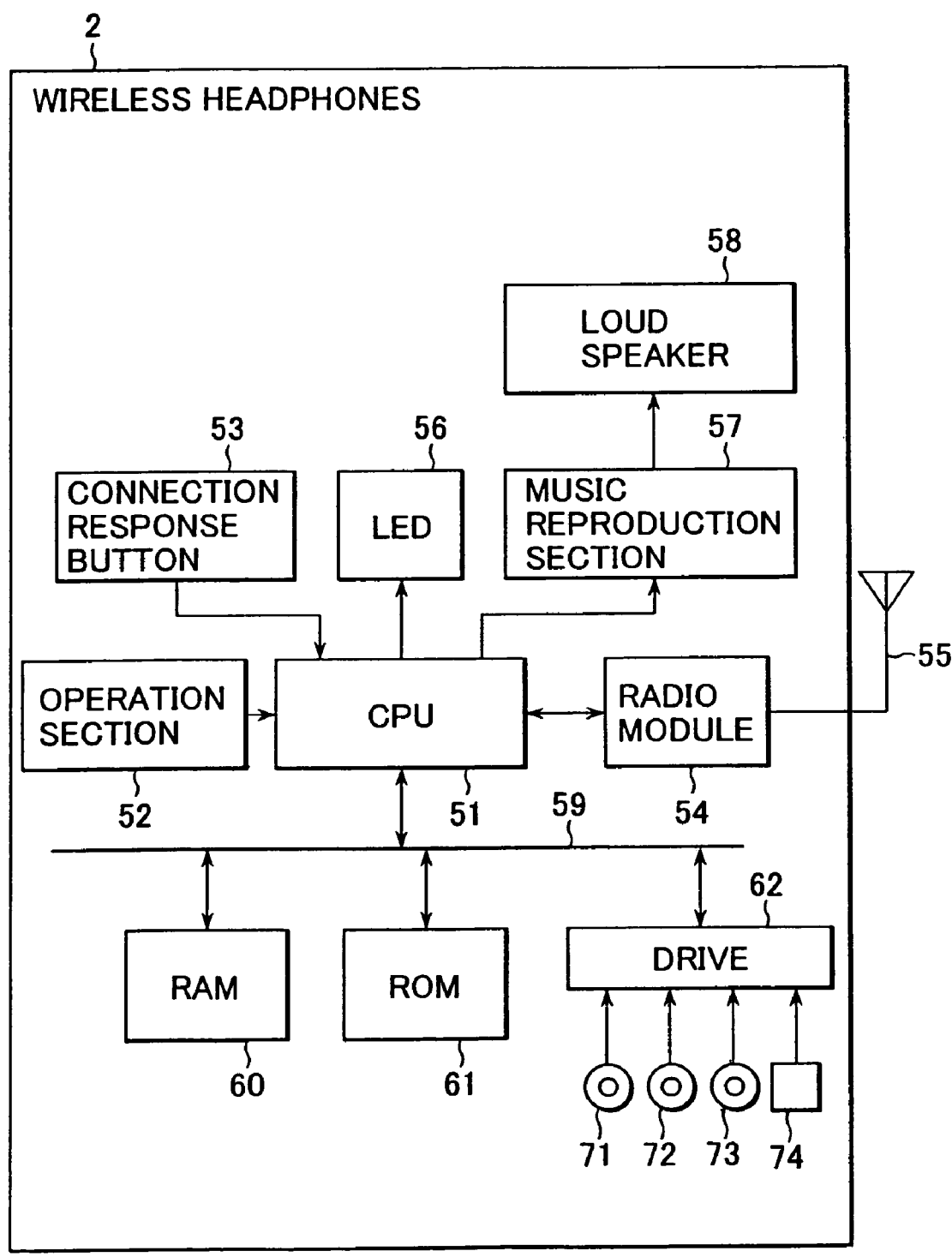
FIG. 3 is a block diagram showing a structure of wireless headphones to which the present invention is applied.

FIG. 3 is a block diagram showing a structure of the wireless headphones 2.

The CPU 51 controls operation of the wireless headphones 2. For example, when the inquiry signal is received which is transmitted by the wireless storage server 1 via the antenna 55 and the radio module 54, or when an LED 56 is blinked or a connection response button 53 is operated, the radio module 54 is controlled so as to transmit a response to an inquiry signal through the antenna 55 to the wireless storage server 1, to establish communication, to light a blinking LED, and to output music contents transmitted by the wireless storage server 1 to an audio reproduction section 57 via the antenna 55 and the radio module 54, so that audio reproduction is carried out at a loud speaker 58.

An operation section 52 comprises a button, a keyboard, a jog dial, a touch panel, etc., receives the user's operation input with respect to a process which is not related to radio communications, such as a change in volume of audio reproduction and supplies the contents of operation to the CPU 31.

The connection response button 53 is operated when the user issues instructions to perform communications with the wireless storage server 1. In other words, the wireless headphones 2 establish connection with the wireless storage server 1, only if the connection response button 53 is operated by the user when the inquiry signal is received from the wireless storage server 1 (that is, even in case the wireless storage server 2 exists within an area where radio communications with the wireless storage server 1 are available).

The radio module 54 converts the data, a control signal, etc., which are supplied by the CPU 51, into the predetermined format by which radio communications are available, amplifies them, and transmits them via the antenna 55, or it receives and amplifies inputs of the data, a response signal, etc., which are received by the antenna 55, converts them into the format which can be processed by the CPU 51, and supplies them to the CPU 51.

According to control of the CPU 51, the LED 56 is lit, turned off, or blinked. As for the LED 56, one capable of being lit in different colors according to the control of the CPU 51 may be employed, for example.

Figure 4:
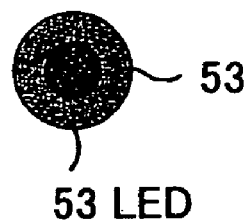
FIG. 4 is a view for explaining an example of structure of a connection response button and an LED.

The connection response button 53 and the LED 56 of the wireless headphones 2 are constructed as one input/output means by providing the LED 56 within the connection response button 53, as shown in FIG. 4. In other words, since the user does not have to look at a plurality of parts of the wireless headphones 2 and does not have to check an operation or a state, thus improving operativity.

Figure 5:
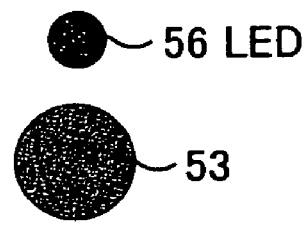
FIG. 5 is a view for explaining an example of structure of the connection response button and the LED.
Figure 6:
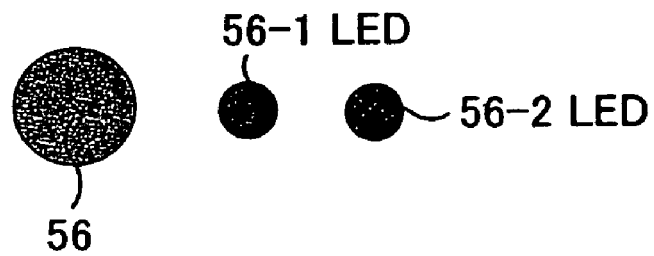
FIG. 6 is a view for explaining an example of structure of the connection response button and the LED.

The connection response button 53 and the LED 56 of the wireless headphones 2 may, of course, be provided in different positions as shown in FIG. 5. Further, the wireless headphones 2 may be provided with a plurality of LED's. For example, as shown in FIG. 6, in addition to connection response button 53, by providing an LED 56-1 and an LED 56-2, the user may be notified of many information items about states of the wireless headphones 2 such as whether or not the inquiry signal has been received and whether or not connection has been established by means of combinations of lighting, turning off, and blinking of two LED's.

The audio reproduction section 57 receives an input of music contents transmitted by the wireless storage server 1 from the CPU 51 via the antenna 55 and the radio module 54, implements predetermined reproduction processes such as D/A (Digital to Analog) conversion, format conversion, decoding, etc., and outputs them to the loud speaker 58, to thereby reproduce the contents.

A RAM 60 and a the ROM 61 are connected to the CPU 51 via the bus 59.

The RAM 60 stores the computer program used in the execution of the CPU 51 and parameters which change suitably in the execution. The ROM 61 stores the basically fixed data among the parameters for operation and the computer programs which are used by the CPU 51.

The drive 62 is connected to the CPU 51 via the bus 59, as needed. The drive 62 is provided with a magnetic disk 71, an optical disc 72, a magneto-optical disc 73, and a semiconductor memory 74, so as to communicate data.

Next, with reference to a flow chart of FIG. 7, a connection establishment process 1 for connecting the storage server 1 and the wireless headphones 2 will be described.

In step S1, the. CPU 31 of the wireless storage server 1 determines whether or not the connection button 11 has been depressed based on a signal supplied from the connection button 11. In step S1, when it is determined that the connection button 11 has not been depressed, the process of step S1 is repeated until it is determined that the connection button 11 is depressed.

In step S1, when it is determined that the connection button 11 has been depressed, the CPU 31, in step S2, generates an inquiry demand command so as to be outputted to the radio module 34.

In step S3, the radio module 34 generates an inquiry packet according to the inquiry demand command inputted from the CPU 31, and transmits the inquiry packet by broadcasting via the antenna 35.

In step S4, the radio module 54 of the wireless headphones 2 determines whether or not the inquiry packet transmitted by the wireless storage server 1 has been received via the antenna 55. In step S4, when it is determined that the inquiry packet has not been received, the process of step S4 is repeated until it is determined that the inquiry packet is received.

In step S4, when it is determined that the inquiry packet has been received, the radio module 54, in step S5, outputs an inquiry reception event to the CPU 51.

In step S6, for example, by controlling the LED 56 to blink, or controlling the audio reproduction section 57 to output a message such as "Are you going to listen to music?" from the loud speaker 58, the CPU 51 of the wireless headphones 2 provides an audio assist to the user so as to notify the user that they may be connected with the wireless storage server 1.

For example, when the user is not carrying the wireless headphones 2, by checking to see if the LED 56 is blinking, the user can confirm that the inquiry signal has been received from the wireless storage server 1. In order to carry out communications with the wireless storage server 1, the connection response button 53 is depressed. On the other hand, when the user is carrying the wireless headphones 2, the user could not check to see if the LED 56 is blinking, and therefore may listen to the audio assist and confirm that the inquiry signal has been received from the wireless storage server 1. In order to perform communications with the wireless storage server 1, the connection response button 53 is depressed.

In step S7, the CPU 51 determines whether or not the connection response button 53 has been depressed, based on the signal supplied from the connection response button 53.

In step S7, when it is determined that the connection response button 53 has not been depressed, in step S8, the CPU 51 controls the LED 56 so as to turn the LED 56 off, the process returns to step S4 and the process thereafter is repeated.

In step S7, when it is determined that the connection response button 53 has been depressed, in step S9, the CPU 51 generates an inquiry response command and outputs the inquiry response command to the radio module 54.

In step S10, the radio module 54 generates an inquiry response packet according to the inquiry response command supplied from the CPU 51, and transmits the inquiry response packet to the wireless storage server 1 via the antenna 55.

In step S11, the radio module 34 of the wireless storage server 1, determines whether or not the inquiry response packet transmitted from the wireless headphones 2 has been received via the antenna 35. In step S11, when it is determined that the inquiry response packet has not been received, the process returns to step S1 and the process thereafter is repeated.

In step S11, when it is determined that the inquiry response packet has been received in step S12, the radio module 34 outputs the received inquiry response packet to the CPU 31. With reference to the inquiry response packet, the CPU 31 extracts an apparatus ID etc. of an inquiry response packet transmitter, generates the connection request signal for the inquiry response packet transmitter, and transmits it to the wireless headphones 2 of the inquiry response packet transmitter via the radio module 34 and the antenna 35.

In step S13, the radio module 54 of the wireless headphones 2 determines whether or not the connection request transmitted by the wireless storage server 1 has been received via the antenna 55. In step S13, when it is determined that the connection request has not been received, the process of step S13 is repeated until it is determined that the connection request is received.

In step S13, when it is determined that the connection request has been received, in step S14, the radio module 54 notifies the CPU 51 that the connection request has been received. The CPU 51 generates a connection response to the connection request so as to be transmitted to the wireless storage server 1 via the radio module 54 and the antenna 55.

In step S15, the CPU 51 establishes the connection with the wireless storage server 1, and controls the LED 56 to be lit.

In step S16, the CPU 31 of the wireless storage server 1 establishes connection with the wireless headphones 2 which transmitted the connection response (a data link is established), and the process is ended.

Figure 7:
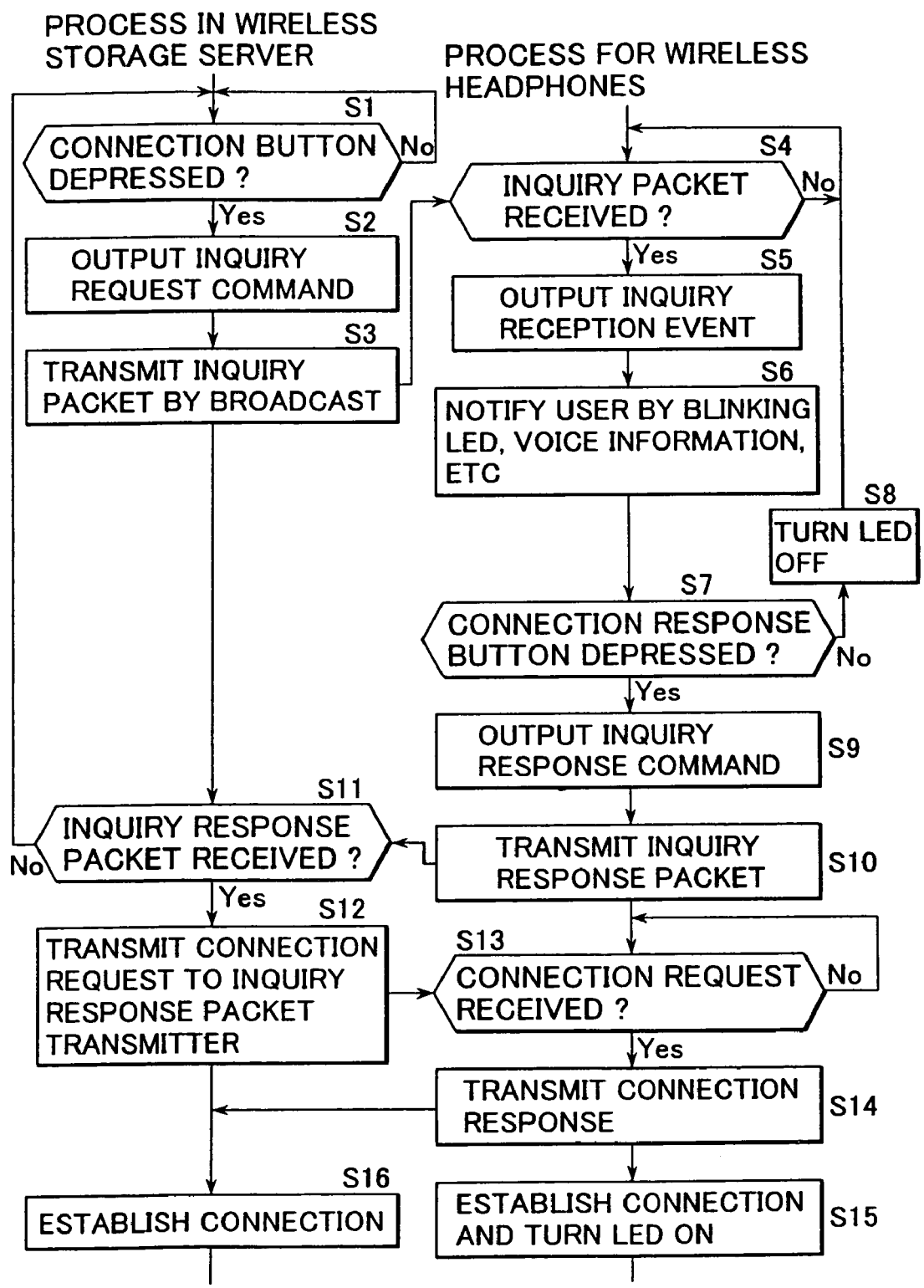
FIG. 7 is a flow chart for explaining a connection establishment process 1.

According to the process as described by using FIG. 7, since the response to the inquiry signal is sent only when the user of the wireless headphones 2 wishes the connection with the wireless storage server 1, the response to the inquiry signal transmitted by the wireless storage server 1 by broadcasting is not transmitted from every apparatus within an area where the inquiry signal reaches, but transmitted only from a required apparatus. Therefore, in the wireless storage server 1, avoiding complicated operations such that the apparatus ID etc. of every apparatus within the area where the inquiry signal reaches are displayed so as to cause the user to choose, it becomes possible to establish connection with desired wireless headphones 2.

Further, since it is determined by the operation performed by the user with respect to the wireless headphones 2 whether or not wireless connection between the wireless storage server 1 and the wireless headphones 2 is carried out, it becomes unnecessary for the wireless storage server 1 to have a display section for displaying the apparatus ID etc. of every the apparatus in the area where the inquiry signal reaches, and an operation input section for choosing a desired apparatus therefrom, so that the structure of the wireless storage server 1 may be simplified and its cost may be reduced.

In the connection establishment process 1 as described by using FIG. 7, the inquiry packet is transmitted from the wireless storage server 1, the user of the wireless headphones 2 who received the inquiry packet is notified of reception of the inquiry packet, and when the user wishes to start communications with the wireless storage server 1, the response packet to the inquiry packet is sent back, so that communications are started. On the other hand, in the wireless headphones 2, before receiving the inquiry packet, based on whether or not the connection response button 53 is operated in advance, the inquiry response packet sent back by the wireless headphones 2 may include the information indicating whether or not communications with the wireless storage server 1 are available.

With reference to a flow chart of FIG. 8, a connection establishment process 2 for connecting the storage server 1 and the wireless headphones 2 will be described.

In step S31 through step S33, the similar process as in step S1 through step S3 as described by using FIG. 7 is carried out. In other words, when the connection button 11 is depressed, the inquiry packet is transmitted by broadcasting from the wireless storage server 1.

In step S34, the CPU 51 of the wireless headphones 2 determines whether or not the connection response button 53 has been depressed based on the signal supplied from the connection response button 53.

In step S34, when it is determined that the connection response button 53 has been depressed, in step S35, the CPU 51 considers a state of the wireless headphones 2 as a connection permission state.

In step S34, when it is determined that the connection response button 53 has not been depressed, or after the end of process of step S35, the radio module 54, in step S36, determines whether or not the inquiry packet transmitted by the wireless storage server 1 has been received via the antenna 55. In step S36, when it is determined that the inquiry packet has not been received, the process returns to step S34 and the process thereafter is repeated.

In step S36, when it is determined that the inquiry packet has been received, in step S37, the radio module 54 outputs the inquiry reception event to the CPU 51.

In step S38, the CPU 51 determines whether or not the state of the wireless headphones 2 is in the connection permission state.

In step S38, when it is determined that the state of the wireless headphones 2 is in the connection permission state, in step S39, the CPU 51 generates the control signal for rendering the connection acceptance flag in an ON state, the flag being contained in the inquiry response packet which answers the wireless storage server 1.

Figure 9:
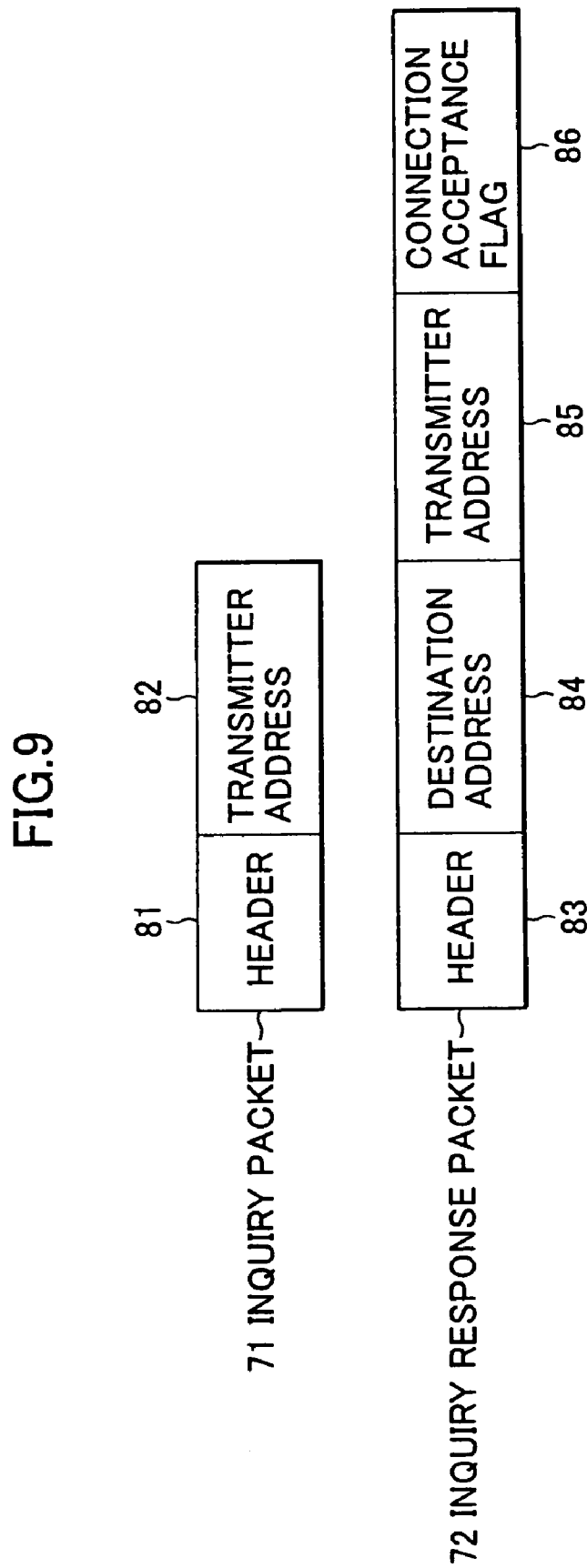
FIG. 9 is a view for explaining an inquiry packet and an inquiry response packet.

Examples of the inquiry packet and the inquiry response packet are shown in FIG. 9. An inquiry packet 71 comprises a header 81 and a transmitter address 82. On the other hand, an inquiry response packet 72 comprises a header 83, a transmission destination address 84, a transmitter address 85, and a connection acceptance flag 86. When it is determined that the state of the wireless headphones 2 is in the connection permission state, the connection acceptance flag contained in the inquiry response packet 72 which answers the wireless storage server 1 is set to the ON state.

In step S38, when it is determined that the state of the wireless headphones 2 is not in the connection permission state, in step S40, the CPU 51 generates the control signal for rendering the connection acceptance flag in an OFF state, the flag being contained in the inquiry response packet which answers the wireless storage server 1. In other words, as described by using FIG. 9, the connection acceptance flag 86 contained in the inquiry response packet 72 which answers the wireless storage server 1 is set to the OFF state.

After the end of process of step S39 or step S40, the CPU 51, in step S41, generates the inquiry response command including the control signal indicating whether the connection acceptance flag contained in the inquiry response packet which answers the wireless storage server 1 is ON or OFF, outputs the inquiry response command to the radio module 54, for example, controls the LED 56 to blink, and notifies the user that it is during processing of connection with the wireless storage server 1.

In step S42, according to the inquiry response command supplied from the CPU 51, the radio module 54 generates the inquiry response packet to be transmits to the wireless storage server 1 via the antenna 55.

In step S43, the radio module 34 of the wireless storage server 1 determines whether or not the response inquiry packet transmitted from the wireless headphones 2 has been received via the antenna 35. In step S43, when it is determined that the inquiry response packet has not been received, the process returns to step S31 and the process thereafter is repeated.

In step S43, when it is determined that the inquiry response packet has been received, in step S44, the radio module 34 outputs the inquiry response packet to the CPU 31. With reference to the inquiry response packet, the CPU 31 determines whether or not the connection acceptance flag 86 is ON. In step S44, when it is determined that the connection acceptance flag 86 is not ON, the process returns to step S31 and the process thereafter is repeated.

In step S44, when it is determined that the connection acceptance flag 86 is ON, in step S45 through step S49, the similar process as in step S12 through step S16 of FIG. 7 is carried out, and connection between the wireless storage server 1 and the wireless headphones 2 is established, then the process is ended.

Figure 8:
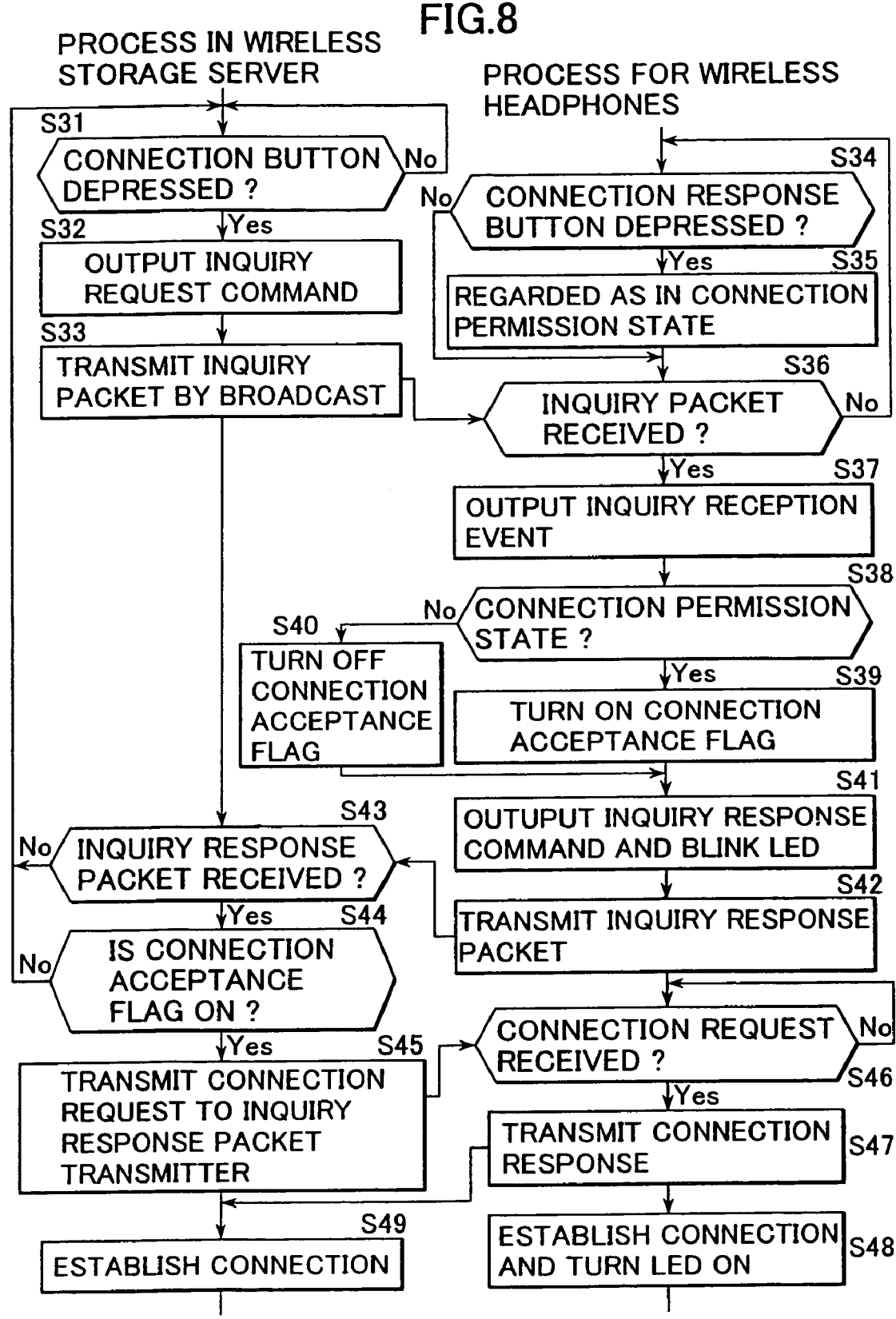
FIG. 8 is a flow chart for explaining a connection establishment process 2.

According to the process as described by using FIG. 8, the CPU 51 of the wireless headphones 2 controls the ON and OFF states of the connection acceptance flag 86 of the inquiry response packet 72, based on whether or not the connection response button 53 was operated beforehand. In the connection establishment process 2 as described by using FIG. 8, unlike the connection establishment process 1 as described by using FIG. 7, the wireless headphones 2 which received the inquiry packet 71 transmitted by the wireless storage server 1 always send back the inquiry response packet 72.

With reference to the ON and OFF states of the connection acceptance flag 86, the wireless storage server 1 which has received the inquiry response packet 72 establishes connection only with the wireless headphones 2 transmitted the inquiry response packet 72 whose connection acceptance flag 86 is ON.

Therefore, in the wireless storage server 1, avoiding complicated operations such that the apparatus ID etc. of every apparatus within the area where the inquiry signal reaches are displayed so as to cause the user to choose, it becomes possible to establish connection with the desired wireless storage server 2. Further, since it becomes unnecessary for the wireless storage server 1 to have a display section for displaying the apparatus ID etc. of every apparatus within the area where the inquiry signal reaches, and the operation input section for choosing the desired apparatus among them, the structure of the wireless storage server 1 may be simplified and its cost may be reduced.

In the connection establishment process 1 as described by using FIG. 7, and the connection establishment process 2 as described by using FIG. 8, based on whether or not the wireless headphones 2 send back the inquiry response packet to the inquiry packet transmitted by the wireless storage server 1 by broadcasting, or whether or not the connection acceptance flag 86 in the replied inquiry response packet 72 is in the ON state, the wireless storage server 1 is adapted to transmit the connection request to the wireless headphones 2. On the other hand, when the user of the wireless headphones 2 wishes to perform communication with the wireless storage server 1, the connection request may be transmitted from the wireless headphones 2 to the wireless storage server 1, with respect to the inquiry packet transmitted by the wireless storage server 1 by broadcasting.

Figure 10:
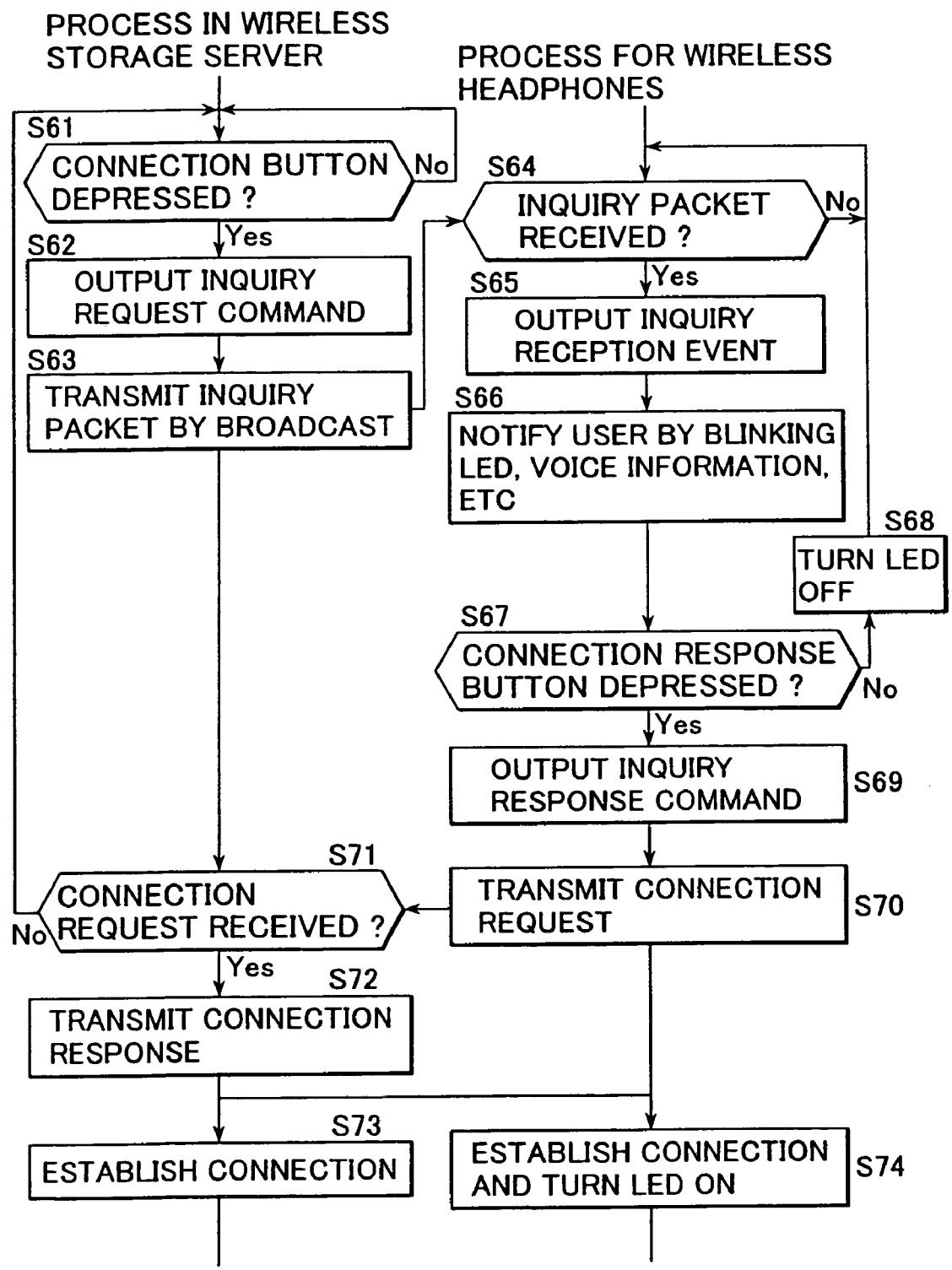
FIG. 10 is a flow chart for explaining a connection establishment process 3.

With reference to FIG. 10, the connection establishment process 3 in which the connection request is transmitted from the wireless headphones 2 to the wireless storage server 1 will be described.

In step S61 through step S69, the similar process as in step S1 through step S9 as described by using FIG. 7 is carried out. In other words, when the connection button 11 is depressed, the inquiry packet is transmitted from the wireless storage server 1 by means of broadband. The wireless headphones 2 notify the user that the inquiry packet is received when the inquiry packet is received. The CPU 51 supplies the inquiry response command to the radio module 54, when an operation of the connection response button 53 is received from the user.

In step S70, the radio module 54 of the wireless headphones 2 generates the connection request signal based on the inquiry response command supplied from the CPU 51, and transmits it to the wireless storage server 1 via the antenna 55.

In step S71, the radio module 34 of the wireless storage server 1 determines whether or not the connection request transmitted from the wireless headphones 2 has been received via the antenna 35. In step S71, when it is determined that the connection request has not been received, the process returns to step S61 and the process thereafter is repeated.

In step S71, when it is determined that the connection request has been received, in step S72, the radio module 34 outputs the received connection request to the CPU 31. The CPU 31 generates the connection response to the connection request, and transmits it to the wireless headphones 2 via the radio module 34 and the antenna 35.

In step S73, the CPU 31 establishes the connection with the wireless headphones 2.

In step S74, the CPU 51 of the wireless headphones 2 establishes the connection with the wireless storage server 1, and controls the LED 56 to be turned on, so that the process is ended.

According to the process as described by using FIG. 10, only when the user of the wireless headphones 2 wishes the connection with the wireless storage server 1, the connection request is transmitted from the wireless headphones 2 to the wireless storage server 1. As with this case, in the wireless storage server 1, avoiding complicated operations such that the apparatus ID etc. of every apparatus within the area where the inquiry signal reaches are displayed so as to cause the user to choose, it becomes possible to establish connection with the desired wireless storage server 2. Further, since it becomes unnecessary for the wireless storage server 1 to have the display section for displaying the apparatus ID etc. of every apparatus within the area where the inquiry signal reaches, and the operation input section for choosing the desired apparatus from them, the structure of the wireless storage server 1 may be simplified and its cost may be reduced.

As for the connection establishment process 3 of FIG. 10, like the connection establishment process 1 as described by using FIG. 7, when the inquiry packet is transmitted from the wireless storage server 1, the user of the wireless headphones 2 who received the inquiry packet is notified of the reception of the inquiry packet, and the user wishes to start communications with the wireless storage server 1 and operates the connection response button 53, the description is carried out assuming that the connection request is transmitted from the wireless headphones 2. However, like the connection establishment process 2 as described by using FIG. 8, when the user of the wireless headphones 2 wishes to start communications with the wireless storage server 1 and operates the connection response button 53 in advance, the connection request may be transmitted from the wireless headphones 2 which received the inquiry packet.

Further, in the connection establishment process 1 as described by using FIG. 7, and the connection establishment process 2 as described by using FIG. 8, although the wireless headphones 2 have been described as receiving the inquiry packet at any time, the wireless headphones 2 may receive the inquiry packet only during the period when the connection response button 53 is depressed.

With reference to a flow chart of FIG. 11, a connection establishment process 4 for connecting the storage server 1 and the wireless headphones 2 will be described.

In step S91 through step S93, the similar process as in step S1 through step S3 as described by using FIG. 7 is carried out. In other words, when the connection button 11 is depressed, the inquiry packet is transmitted from the wireless storage server 1 by means of broadband.

In step S94, the CPU 51 of the wireless headphones 2 determines whether or not the connection response button 53 has been depressed, based on the signal supplied from the connection response button 53.

In step S94, when it is determined that the connection response button 53 has not been depressed, the process of step S94 is repeated until the connection response button is depressed.

In step S94, when it is determined that the connection response button 53 has been depressed, in step S95, the CPU 51 changes the state of the wireless headphones 2 into a waiting state for the inquiry packet. When it is in the state where the connection response button 53 is not depressed (i.e., when it is not in the waiting state for the inquiry packet), and when the inquiry packet is transmitted by the wireless storage server 1, even if the wireless headphones 2 exist within a transmission service area, they do not receive the inquiry packet.

In step S96, the radio module 54 determines whether or not the inquiry packet transmitted by the wireless storage server 1 has been received via the antenna 55. In step S96, when it is determined that the inquiry packet has not been received, the process returns to step S94 and the process thereafter is repeated.

In step S96, when it is determined that the inquiry packet has been received, in step S97, the radio module 54 outputs the inquiry reception event to the CPU 51.

In step S98, the CPU 51 generates the inquiry response command and outputs the inquiry response command to the radio module 54, for example, controls the LED 56 to be blinked, and notifies the user that it is during processing of connection with the wireless storage server 1.

In step S99, according to the inquiry response command supplied from the CPU 51, the radio module 54 generates the inquiry response packet so as to be transmitted to the wireless storage server 1 via the antenna 55.

In step S100, the radio module 34 of the wireless storage server 1 determines whether or not the inquiry response packet transmitted from the wireless headphones 2 has been received via the antenna 35. In step S100, when it is determined that the inquiry response packet has not been received, the process returns to step S91 and the process thereafter is repeated.

In step S100, when it is determined that the inquiry response packet has been received, in step S101 through step S105, the similar process as in step S45 of FIG. 7 through step S49 is performed, the connection between the wireless storage server 1 and the wireless headphones 2 is established, and the process is ended.

Figure 11:
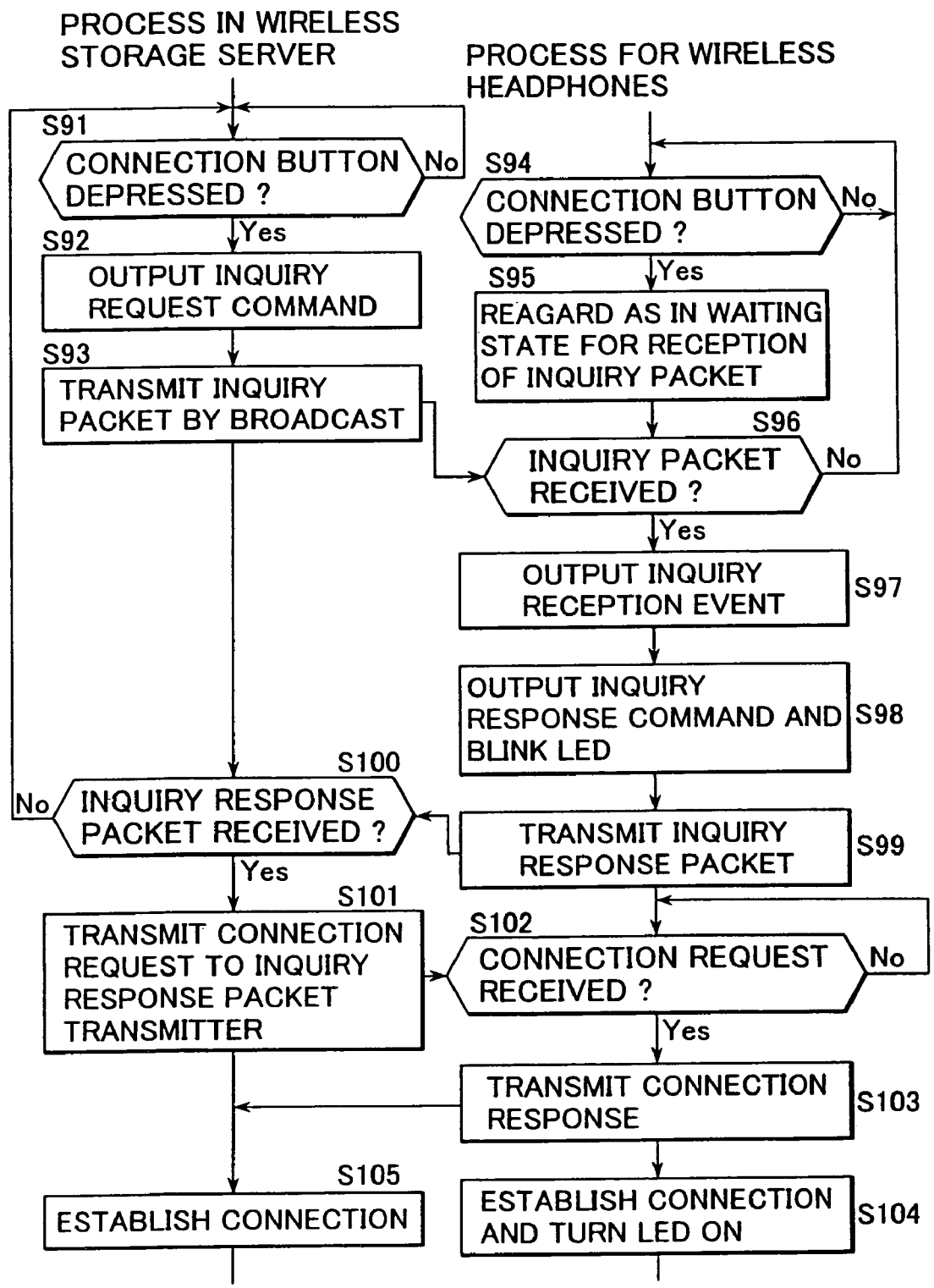
FIG. 11 is a flow chart for explaining a connection establishment process 4.

According to the process as described by using FIG. 11, since the wireless headphones 2 may receive the inquiry packet transmitted by the wireless storage server 1 only during the period when the connection response button 53 is depressed, the wireless storage server 1 does not receive the inquiry response from the wireless headphones 2 which does not wish to be connected.

Therefore, as with this case, in the wireless storage server 1, avoiding complicated operations such that the apparatus ID etc. of every apparatus within the area where the inquiry signal reaches are displayed so as to cause the user to choose, it becomes possible to establish connection with the desired wireless storage server 2. Further, since it becomes unnecessary for the wireless storage server 1 to have the display section for displaying the apparatus ID etc. of every apparatus within the area where the inquiry signal reaches, and the operation input section for choosing a desired apparatus from them, the structure of the wireless storage server 1 may be simplified and its cost may be reduced.

Further, in the connection establishment process 4 as described by using FIG. 11, as to the inquiry packet transmitted by the wireless storage server 1 by broadcasting, the inquiry response packet is sent back from the wireless headphones 2 in the state where the connection response button 53 is depressed. On the other hand, as with the connection establishment process 3 as described by using FIG. 10, the wireless headphones 2 in the state where the connection response button 53 is depressed may send back the connection request with respect to the inquiry packet transmitted by the wireless storage server 1 by broadcasting.

The above processes have been described in case the storage and the server in radio communications are devices different from each other. Next, operations in devices which may operate as a server and as storage in radio communications will be described.

Figure 12:
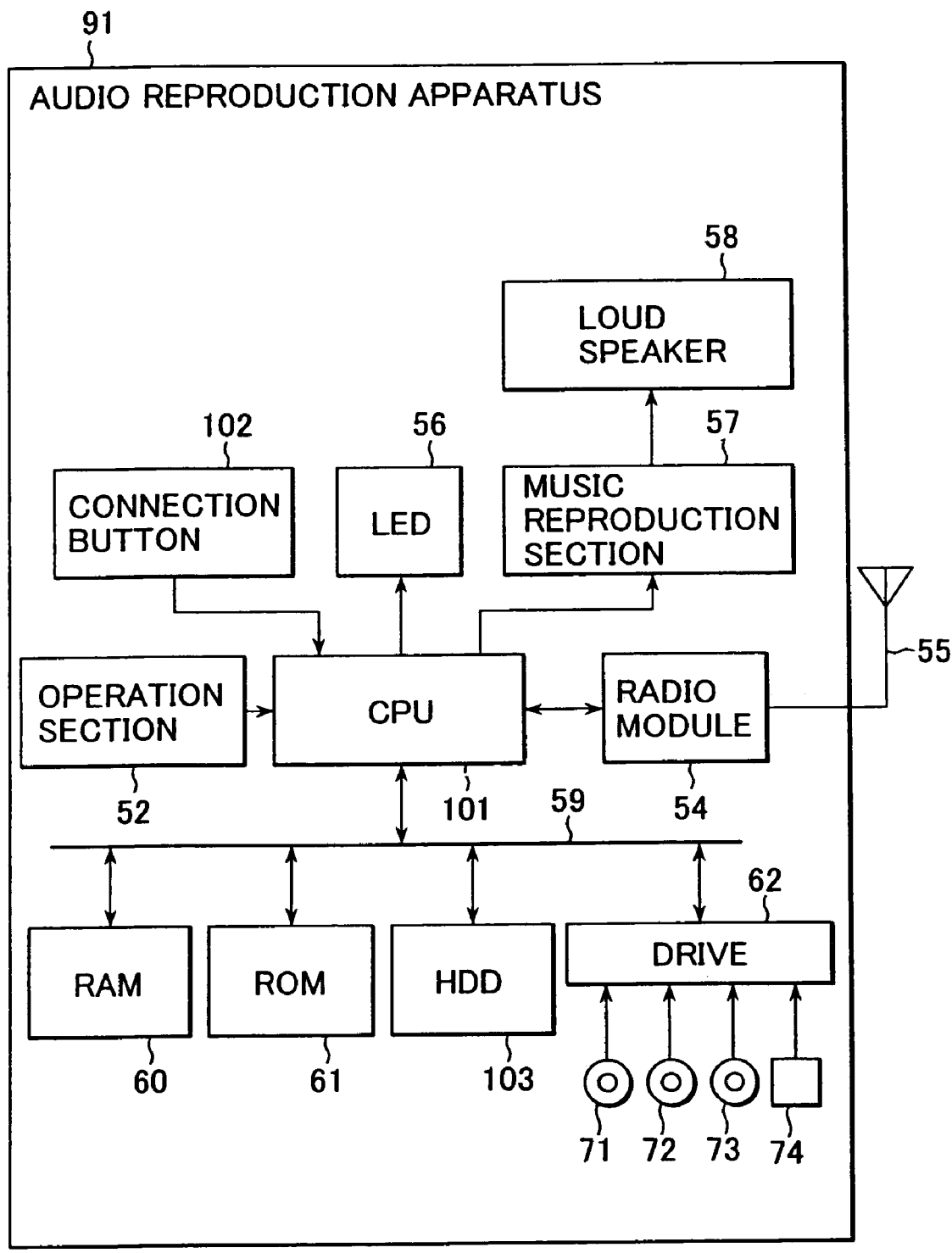
FIG. 12 is a block diagram showing a structure of a audio reproduction apparatus applying the present invention.

FIG. 12 is a block diagram showing a structure of an audio reproduction apparatus 91 which may be operated as a server and as storage in radio communications. It should be noted that in FIG. 12, the same reference numbers are given to elements corresponding to those in the wireless headphones 2 as described by using FIG. 3, and their description is omitted accordingly.

In other words, the audio reproduction apparatus 91 of FIG. 12 has basically the same structure as the wireless headphones 2 of FIG. 3, except that a CPU 101 is provided instead of the CPU 51, a connection button 102 is provided instead of the connection response button 53 and further an HDD 103 is added.

The CPU 101 controls operation of the audio reproduction apparatus 91. For example, when the connection button 102 is operated, it determines whether it is operated before or after the reception of the inquiry signal. If it is operated before reception of an inquiry signal, the radio module 54 is controlled, and the inquiry signal is transmitted by broadcasting via the antenna 55, and if it is operated after reception of the inquiry signal, the LED 56 is controlled to blink, so as to notify the user of the reception of the inquiry packet. Further, according to the user's operation input which is inputted from the operation section 52, the CPU 101 outputs the music contents stored in the HDD 103 to the audio reproduction section 57, so as the audio reproduction is carried out at the loud speaker 58, or transmits them to other devices via the radio module 54 and the antenna 55.

The connection button 102 is adapted to be the master in radio communications, until it receives the inquiry signal. It is operated by the user when instructions to transmit the inquiry signal are issued by broadcasting. After receiving the inquiry signal, it serves as the slave in radio communications, and it is operated by the user when instructions to send back the response to the inquiry signal of the master are issued.

Further, the connection button 102 and the LED 56 may be constituted, for example, as one input/output means similar to the connection response button 53 and the LED 56 as described by using FIG. 4. In other words, since the user does not have to look at a plurality of parts of the audio reproduction apparatus 91 and does not have to check an operation or a state, thus improving operativity.

In addition, the connection button 102 and the LED 56 of the audio reproduction apparatus 91 may be, of course, provided in different positions similar to the connection response button 53 and the LED 56 as described by using FIG. 5.

The HDD 103 drives hard disks to be caused to record therein or reproduce the computer program and information which are executed by the CPU 101, records music contents to be transmitted to another information processing apparatus (another audio reproduction apparatus 91, for example) so as to be reproduced, and outputs them via the bus 59 according to control of the CPU 101.

Next, operation of audio reproduction apparatus 91 will be described.

When the connection button 102 is depressed by the user in the state where the radio module 54 does not receive the inquiry signal from another information processing apparatus (for example, another audio reproduction apparatus 91), the CPU 101 recognizes the audio reproduction apparatus 91 as the master, controls the radio module 54, and transmits the inquiry packet from the antenna 55 by broadcasting.

When the inquiry response packet is received via the antenna 55 and the radio module 54, the CPU 101 establishes radio connection by transmitting the connection request to the inquiry response packet transmitter, for example, according to the user's operation input, it transmits the music contents stored in the HDD 103 to the inquiry response packet transmitter via the radio module 54 and the antenna 55.

When the radio module 54 receives the inquiry signal from another information processing apparatus (for example, another audio reproduction apparatus 91) before the connection button 102 is depressed by the user, the CPU 101 recognizes the audio reproduction apparatus 91 as the slave, controls the LED 56 to be blinked, and notifies the user that the inquiry packet has been received.

When the connection button 102 is operated by the user: within a predetermined period of time, the CPU 101 generates the response packet with respect to the inquiry, and transmits it through the radio module 54 and the antenna 55 to the inquiry packet transmitter.

In addition, when the connection button 102 is not operated by the user within the predetermined period of time, the CPU 101 controls the LED 56 to be turned off, and notifies the user that it is not during processing.

Moreover, if the time when the connection button 102 is depressed by the user and the time when the radio module 54 receives the inquiry signal from another information processing apparatus (for example, another audio reproduction apparatus 91) are simultaneous, one device is adapted to be the master and the other device is adapted to be the slave, so that a determination process of radio communications can be performed.

With reference to flow charts of FIG. 13 and FIG. 14, a process of the audio reproduction apparatus 91 will be described.

In step S121, the radio module 54 determines whether or not the inquiry packet has been received. In step S121, when it is determined that the inquiry packet has not been received, the process goes to step S131.

In step S121, when it is determined that the inquiry packet has been received, the audio reproduction apparatus 91 functions as the slave. In step S122, the radio module 54 outputs the inquiry reception event to the CPU 101. The CPU 101 receives the inquiry reception event and recognizes itself as having become the slave.

In step S123, the CPU 101 notifies the user that the inquiry signal has been received from another information processing apparatus by controlling the LED 56 to blink, or controlling the audio reproduction section 57 to output a message of "Are you going to listen to music?" from the loud speaker 58, for example, so as to perform the audio assist with the user.

In step S124, the CPU 101 determines whether or not the connection button 102 has been depressed, based on the signal supplied from the connection button 102.

In step S124, when it is determined that the connection button 102 has not been depressed, in step S125, the CPU 101 controls the LED 56 to be turned off, the process returns to step S121 and the process thereafter is repeated.

In step S124, when it is determined that the connection button 102 has been depressed, in step S126, the CPU 101 outputs the inquiry response command to the radio module 54.

In step S127, the radio module 54 transmits the inquiry response packet to the inquiry signal transmitter via the antenna 55.

In step S128, the radio module 54 determines whether or not the connection request was received via the antenna 55. In step S128, when it is determined that the connection request has not been received, the process of step S128 is repeated until it is determined that the connection request is received.

In step S128, when it is determined that the connection request has been received, in step S129, the radio module 54 notifies the CPU 101 that having the connection request has been received. The CPU 101 transmits the connection response to the connection request transmitter via the radio module 54 and the antenna 55.

In step S130, the CPU 101 establishes connection with the inquiry signal transmitter, and turns the LED 56 on, and the process is ended.

In step S121, when it is determined that the inquiry packet has not been received, in step S131, the CPU 101 determines whether or not the connection button 102 has been depressed, based on the signal supplied from the connection button 102. In step S131, when it is determined that the connection button 102 has not been depressed, the process returns to step S121 and the process thereafter is repeated.

In step S131, when it is determined that the connection button 102 has been depressed, the audio reproduction apparatus 91 functions as the master. In step S132, the CPU 101 recognizes itself as having become the master and outputs the inquiry demand command to the radio module 54.

In step S133, the radio module 54 generates the inquiry packet, transmits the inquiry packet by broadcasting via the antenna 55, and controls the LED 56 to blink.

In step S134, the radio module 54 determines whether or not the inquiry response packet has been received via the antenna 55.

In step S134, when it is determined that the inquiry response packet has not been received, in step S135, the radio module 54 notifies the CPU 101 that the inquiry response packet has not been received. The CPU 101 controls the LED 56 to be turned off, the process returns to step S121, and the process thereafter is repeated.

In step S134, when it is determined that the inquiry response packet has been received, in step S136, the radio module 54 notifies the CPU 101 that the inquiry response packet has been received. The CPU 101 transmits the connection request to the inquiry response packet transmitter via the radio module 54 and the antenna 55.

In step S137, the radio module 54 determines whether or not the connection response has been received via the antenna 55. In step S137, when it is determined that the connection response has not been received, the process of step S137 is repeated until it is determined that the connection response is received.

In step S137, when it is determined that the connection response has been received, in step S138, the radio module 54 notifies the CPU 101 that the connection response has been received. The CPU 101 establishes connection with the connection response transmitter, controls the LED 56 to be turned on, and the process is ended.

Figure 13:
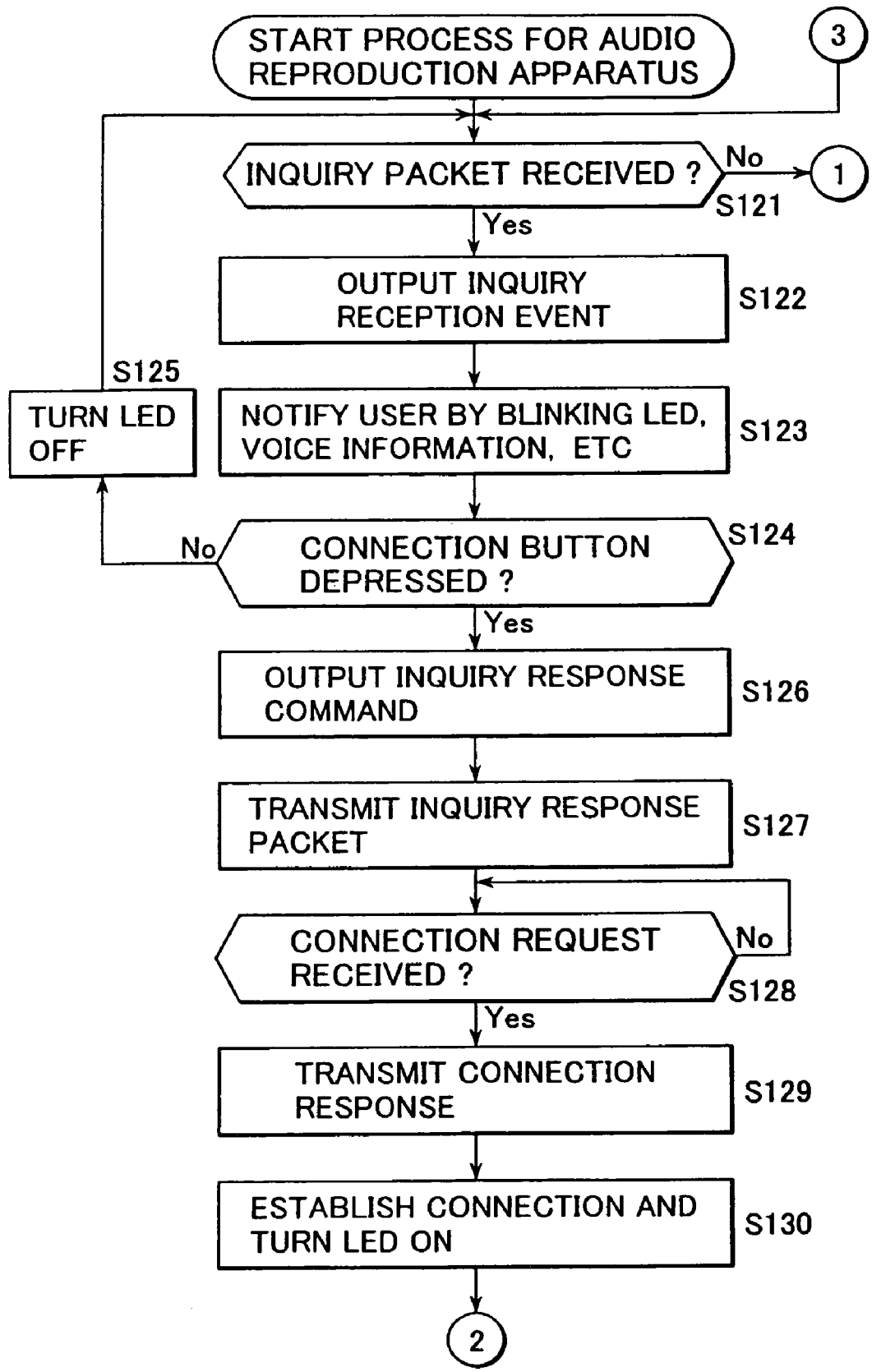
FIG. 13 is a flow chart for explaining a process in the audio reproduction apparatus.

In the processes as described by using FIG. 13 and FIG. 14, when the connection button 102 is operated before the inquiry packet is received, the audio reproduction apparatus 91 operates as the master. When the inquiry packet is received before the connection button 102 is operated, it operates as the slave.

In other words, depending on the operation timing, the connection button 102 may issue instructions to transmit the inquiry packet or issue to transmit the response packet to the inquiry. By this construction, the audio reproduction apparatus 91 does not have to comprise the display section for displaying the apparatus ID etc. of every apparatus within the area where the inquiry signal reaches, or the operation input section for choosing the desired apparatus from them. Further, for example, the same connection button 102 may issue instructions concerning transmission of the inquiry packet and transmission of the response packet to the inquiry may be ordered, so that the structure may be simplified and its cost may be reduced.

In step S127 of FIG. 13, although the audio reproduction apparatus 91 has been described as transmitting the inquiry response packet, the audio reproduction apparatus 91 may transmit the connection request instead of the inquiry response packet.

Further, although the audio reproduction apparatus 91 has been described as determining whether or not the inquiry response packet has been received in step S134 and as transmitting the connection request in step S136 when it is determined that the inquiry response packet has been received, instead of these processes, it may transmit the connection response in step S136, when it determines whether or not the connection request has been received in step S134 and if the connection request is received.

Although the audio reproduction apparatus 91 has been described as having the audio reproduction section 57 and the loud speaker 58, and as being capable of notice with voice in order to notify that the inquiry packet has been received, even in the case where the notice with voice may not be available, for example, if the user is able to check the LED 56, it is possible to notify the user only by means of the LED 56.

In addition, two audio reproduction apparatuses 91 which are not in the slave state, when connection buttons are depressed at the same time, one of the audio reproduction apparatus 91 becomes the master and the other audio reproduction apparatus 91 becomes the slave, so that connection between two audio reproduction apparatuses 91 may be established. It should be noted that the audio reproduction apparatuses 91 are, of course, able to establish connection with a device capable of radio communications other than the audio reproduction apparatuses 91.

As shown in FIG. 15, in the Bluetooth communications, the master has a mode in which two inquiry signals, General Inquiry and Limited Inquiry, are transmitted. On the other hand, the slave has the two modes of General Discoverable Mode and Limited Discoverable Mode. The wireless storage server 1 and the audio reproduction apparatus 91 (master) which have been described above each perform Limited Inquiry as the button is depressed. The wireless headphones 2 and the audio reproduction apparatus 91 (slave) which have been described above serve as Limited Discoverable Mode as the button is depressed.

For example, when there is a slave in General Discoverable Mode within an area of reach of an inquiry signal of the wireless storage server 1 as described above or of the audio reproduction apparatus 91 which has become the master, the slave in General Discoverable Mode does not respond to Limited Inquiry. In other words, by applying the present invention, when there is a slave in General Discoverable Mode which does not desire radio connection, the master does not receive the response. Therefore, by applying the present invention, the user may establish the connection between the master and the slave which actually desires the connection by means of an easy operation.

In FIG. 1 through FIG. 11, the wireless storage server 1 which transmits music contents data by radio communications and the wireless headphones 2 which receive and reproduce the music contents data by radio communications have been described. In FIG. 12 through FIG. 14, the audio reproduction apparatus 91 has been described which communicates the music contents data by radio communications and can reproduce the music contents. However, the present invention may be naturally applied to the case where any information other than the music contents (for example, audio data other than music, text data, computer program data, still image data, and video data, data including plural data among these data, etc.) is communicated.

The series of processes as described above may also be realized by software. The software is installed via a recording medium into a computer in which a computer program constituting the software is built in dedicated hardware, a general-purpose personal computer capable of executing various kinds of functions by installing therein various kinds of computer programs, etc.

As shown in FIG. 2, FIG. 3, or FIG. 12, the recording media may be constituted by package media such as the magnetic disk 41 or the magnetic disk 71 (including a flexible disk), the optical disc 42 or the optical disc 72 (including a CD-ROM (Compact Disk-Read Only Memory) and a DVD (Digital Versatile Disk)), the magneto-optical disc 43 or the magneto-optical disc 73 (including MD (Mini-Disk) (trademark)), the semiconductor memory 44 or the semiconductor memory 74, which are distributed apart from the computer in order to provide the user with the computer program and in which the computer program is recorded.

In addition, in this specification, the step of describing the computer program recorded on the recording medium includes not only a process chronologically implemented in accordance with a described order but also a process implemented in parallel or individually which is not necessarily processed chronologically.

Moreover, in this specification, "system" shall be understood as indicating a whole apparatus constituted by a plurality of apparatuses.

INDUSTRIAL APPLICABILITY

In this way, according to the present invention, it is possible to realize radio communications with another radio communication apparatus.

In particular, according to the present invention, only when the user permits radio communications with another radio communication apparatus, the radio communications can be performed, therefore, when the radio communication apparatus itself is the slave, avoiding complicated operations such that the apparatus ID etc. of every apparatus within the area where the inquiry signal reaches are displayed on the radio communication apparatus to be the master, so that the user using a radio communication apparatus to be the master is caused to choose a device for performing radio communications, it becomes possible to establish connection with the desired slave. In addition, in this case, the operation of the slave is also considerably simple.

According to the first present invention, it becomes unnecessary for the radio communication apparatus serving as the master to have the display section for displaying the apparatus ID etc. of all apparatuses within the area where the inquiry signal reaches, and an operation input section for selecting a desired apparatus, so that its cost may be reduced.

According to other present inventions, it is possible to realize radio communications between two radio communication apparatuses, in particular only when the user of the radio communication apparatus on the slave side permits radio communications with the radio communication apparatus as being the master, radio communications can be performed, therefore avoiding complicated operations such that the apparatus ID etc. of every apparatus within the area where the inquiry signal reaches are displayed on the radio communication apparatus to be the master, so that the user using the radio communication apparatus to be the master is caused to choose the device for performing radio communications, it becomes possible to establish connection with the desired slave. In addition, the operation of the slave is also considerably simple.

Furthermore, since it becomes unnecessary for the radio communication apparatus as the master to have the display section for displaying the apparatus ID etc. of all apparatuses within the area where the inquiry signal reaches and the operation input section for choosing the desired apparatus among them, the cost may be reduced.

The invention claimed is:

1. A first radio communication apparatus configured for short range wireless radio communication with a second radio communication apparatus, the first radio communication apparatus comprising:
   first input means for receiving a user input that configures the first radio communication apparatus to broadcast an inquiry signal, wherein a unique identification for the second radio communication apparatus is not specified in the inquiry signal from the first radio communication apparatus:
   receiving means for receiving predetermined information from the second radio communication apparatus, wherein the predetermined information is sent in response to user input to the second radio communication apparatus; and
   communicating means for communicating, using short range wireless radio, with the second radio communication apparatus based on the predetermined information.

2. A short range wireless communications method for a first radio communication apparatus configured for communicating with a second radio communication apparatus, the method comprising:
   receiving a user input that configures the first radio communication apparatus to broadcast an inquiry signal, wherein a unique identification for the second radio communication apparatus is not specified in the inquiry signal from the first radio communication apparatus;
   receiving predetermined information from the second radio communication apparatus, wherein the predetermined information is sent in response to user input to the second radio communication apparatus; and
   communicating, using short range wireless radio, with the second radio communication apparatus based on the predetermined information.

* * * * *